(12) United States Patent
Ueda et al.

(10) Patent No.: US 7,295,508 B2
(45) Date of Patent: Nov. 13, 2007

(54) OPTICAL DISK

(75) Inventors: Daisuke Ueda, Tokyo (JP); Takeshi Yamasaki, Kanagawa (JP); Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 10/491,980

(22) PCT Filed: Aug. 5, 2003

(86) PCT No.: PCT/JP03/09943

§ 371 (c)(1),
(2), (4) Date: Apr. 7, 2004

(87) PCT Pub. No.: WO2004/015703

PCT Pub. Date: Feb. 19, 2004

(65) Prior Publication Data

US 2004/0246883 A1    Dec. 9, 2004

(30) Foreign Application Priority Data

Aug. 9, 2002  (JP) ............................. 2002-232312

(51) Int. Cl.
*G11B 7/24*    (2006.01)
(52) U.S. Cl. .................... 369/275.5; 369/283
(58) Field of Classification Search ............ None
See application file for complete search history.

(56) References Cited

U.S. PATENT DOCUMENTS

| | | | |
|---|---|---|---|
| 5,401,609 A * | 3/1995 | Haratani et al. | 430/270.12 |
| 5,498,507 A * | 3/1996 | Handa et al. | 430/273.1 |
| 5,569,517 A * | 10/1996 | Tominaga et al. | 428/64.1 |
| 6,245,403 B1 * | 6/2001 | Spahni et al. | 428/64.1 |
| 6,383,722 B1 * | 5/2002 | Shinkai et al. | 430/321 |
| 2002/0122379 A1 * | 9/2002 | Tamada et al. | 369/288 |
| 2003/0118936 A1 * | 6/2003 | Okubo | 430/270.12 |
| 2003/0186085 A1 * | 10/2003 | Murata et al. | 428/694 ST |
| 2004/0139460 A1 * | 7/2004 | Wada et al. | 720/723 |

FOREIGN PATENT DOCUMENTS

| | | |
|---|---|---|
| JP | 60-074136 | 4/1985 |
| JP | 2001-307333 | 11/2001 |
| JP | 2001-307381 | 11/2001 |
| JP | 2002-025109 | 1/2002 |
| JP | 2002-092962 | 3/2002 |
| JP | 2002-157780 | 5/2002 |
| JP | 2002-157782 | 5/2002 |
| JP | 2002-157783 | 5/2002 |
| JP | 2002-175645 | 6/2002 |
| JP | 2002-208178 | 7/2002 |

* cited by examiner

*Primary Examiner*—Wayne Young
*Assistant Examiner*—Abdukader Muhammed
(74) *Attorney, Agent, or Firm*—Robert J. Depke; Rockey, Depke & Lyons LLC.

(57) ABSTRACT

The present invention provides an optical disc which is constituted by a substrate, a recording layer, and a protection layer and is irradiated with a laser beam from the protection layer side. The optical disc has the substrate whose diameter is greater than 50 mm, the recording layer provided on the substrate, and the protection layer which is layered on the recording layer and thinner than the substrate and on which a recording or reproducing laser beam is incident. The total thickness of the optical disc is 0.7 mm or more.

4 Claims, 3 Drawing Sheets

OPTICAL DISK

TECHNICAL FIELD

The present invention relates to an optical disc and particularly to an optical disc constituted by a substrate, a recording layer, and a protection layer and irradiated with a laser beam from the side of the protection layer.

This application is based upon and claims the benefit of priority from the prior Japanese Patent Application No. 2002-232312 filed on Aug. 9, 2002 in Japanese Patent Office, the entire contents of which are incorporated herein by reference.

BACKGROUND ART

In recent years, there have been demands for developments in recording media for storing information recorded/processed, in view of portable information recording/processing terminals, such as cellular phones, PDAs (Personal Digital Assistants), mobile personal computers, video cameras, digital still cameras, portable recording/reproducing devices.

Developed as those recording media have been devices using optical discs as removable media which are cheap and easy to handle. Studies have further been being made on these devices.

Portable information recording/processing terminals have a compact size from the viewpoint of conveniences, so the optical discs to be used must have a small size. However, the volume of data recordable in every disc must be large in consideration of, for example, use for video cameras and PDAs which deal with data of large information amounts.

In order to realize recording or reproducing data at a high recording density, there has been a popularly used method. In this method, the wavelength of a recording or reproducing laser beam has to be shortened, and the numerical aperture (NA) of an objective lens which converges the recording or reproducing laser beam onto an optical disc has to be enlarged. Based on this method, discussions are made on a structure, for example, using blue light having a wavelength of 450 nm or less for the recording or reproducing laser beam, setting the NA of the objective lens to 0.78 or more, and an optical disc having a thinner protection layer than 0.1 mm.

If the optical disc having this thinner protection layer is applied to an optical disc of a type having a small diameter of about 50 mm, for example, data whose volume is as large as 2 GB or more can be recorded and reproduced per disc.

Meanwhile, optical discs used for portable information recording/processing terminals are exposed to extreme changes in temperature and humidity due to environmental changes as the discs are carried. Hence, warping of the discs due to changes in temperature and humidity must be small with respect to the optical discs used for portable information recording/processing terminals.

In case of the small diameter optical discs having a thin protection layer as described above, detailed knowledge has not yet been stocked about the warping according to changes in temperature and humidity. There hence has been a conventional way of thinking that, for example, the warping due to changes in temperature and/or humidity need not be considered but the disc thickness may be decided fixing the ratio between the disc diameter and the disc thickness.

If the disc thickness is thus decided without considering changes in temperature or humidity, the optical discs are warped greatly due to changes in temperature and humidity. This leads to a problem that accurate recording/reproducing of information signals cannot be performed on the optical discs.

DISCLOSURE OF THE INVENTION

An object of the present invention is to provide a novel optical disc capable of eliminating problems of the prior art as described above.

Another object of the present invention is to provide an optical disc capable of reducing warping due to change in temperature and/or humidity, and a method of manufacturing the optical disc.

An optical disc according to the present invention comprises: a substrate having a diameter greater than 50 mm; a recording layer provided on the substrate; and a protection layer which is layered on the recording layer and thinner than the substrate and on which a recording/reproducing laser beam is incident, wherein the optical disc has a total thickness of 0.7 mm or more.

Another optical disc according to the present invention comprises: a substrate having a diameter of about 80 mm; a recording layer provided on the substrate; and a protection layer which is layered on the recording layer and having a thickness of 0.1 mm and on which a recording/reproducing laser beam is incident, wherein the optical disc has a total thickness of 0.94 mm or more.

Further another optical disc according to the present invention comprises: a substrate having a diameter of about 50 mm; a recording layer provided on the substrate; and a protection layer which is layered on the recording layer and having a thickness of 0.1 mm and on which a recording/reproducing laser beam is incident, wherein the optical disc has a total thickness of 0.7 mm or more.

Further another optical disc according to the present invention comprises: a substrate having a diameter of about 51.5 mm; a recording layer provided on the substrate; and a protection layer which is layered on the substrate and having a thickness of 0.08 mm and on which a recording/reproducing laser beam is incident, wherein the optical disc has a total thickness of 0.8 mm or more.

Further another optical disc according to the present invention comprises at least: a substrate; a recording layer layered on the substrate and having a single-layer structure or multilayer structure; and a protection layer which is layered on the recording layer and thinner than the substrate and on which a recording or reproducing laser beam is incident, wherein the substrate and the recording layer are formed to satisfy conditions of expressions below:

$$\int_0^{n1} E1(y)e(y)\,dy + \int_{n1}^{n1+n2} E2(y)e(y)\,dy + \ldots + \int_{n1+\ldots+nm-1}^{n1+\ldots+nm} Em(y)e(y)\,dy = \int_0^{n1} \alpha 1(y)TE1(y)\,dy + \int_{n1}^{n1+n2} \alpha 2(y)TE2(y)\,dy + \ldots + \int_{n1+\ldots+nm-1}^{n1+\ldots+nm} \alpha m(y)TEm(y)\,dy, \quad (1)$$

$$\int_0^{n1} E1(y)e(y)y\,dy + \int_{n1}^{n1+n2} E2(y)e(y)y\,dy + \ldots + \int_{n1+\ldots+nm-1}^{n1+\ldots+nm} Em(y)e(y)y\,dy = \int_0^{n1} \alpha 1(y)TE1(y)y\,dy + \quad (2)$$

$$\int_{n1}^{n1+n2} \alpha 2(y)TE2(y)y\,dy + \ldots + \int_{n1+\ldots+nm-1}^{n1+\ldots+nm} \alpha m(y)TEm(y)y\,dy,$$

$$e(y)eo+ky \quad (3), \text{ and}$$

$$\theta = -k1 \quad (4),$$

where y expresses displacement in a thickness direction of the optical disc, ni (i=1, 2, 3, ..., m) expresses a thickness of each of the layers forming the optical disc, m (m≧2) expresses a total number of the layers forming the optical disc, Ei (i=1, 2, 3, ..., m) expresses a Young's modulus of each of the layers forming the optical disc, e(y) expresses a distortion generated in the optical disc, eo expresses an initial distortion of the optical disc, αi (i=1, 2, 3, ..., m) expresses an expansion coefficient depending on temperature and/or humidity in each of the layers forming the optical disc, T expresses an amount of change in temperature and/or humidity around the optical disc, θ expresses a warping amount of the optical disc, k expresses a curvature of the optical disc, and l expresses a width of an area where the layers forming the optical disc are layered.

Further other objects and advantages achieved by the present invention will be more clearly understood from the embodiments described below with reference to the drawings.

BEST MODE FOR CARRYING OUT THE INVENTION

An optical disc according to the present invention will now be described in detail with reference to the drawings.

Figure 1:
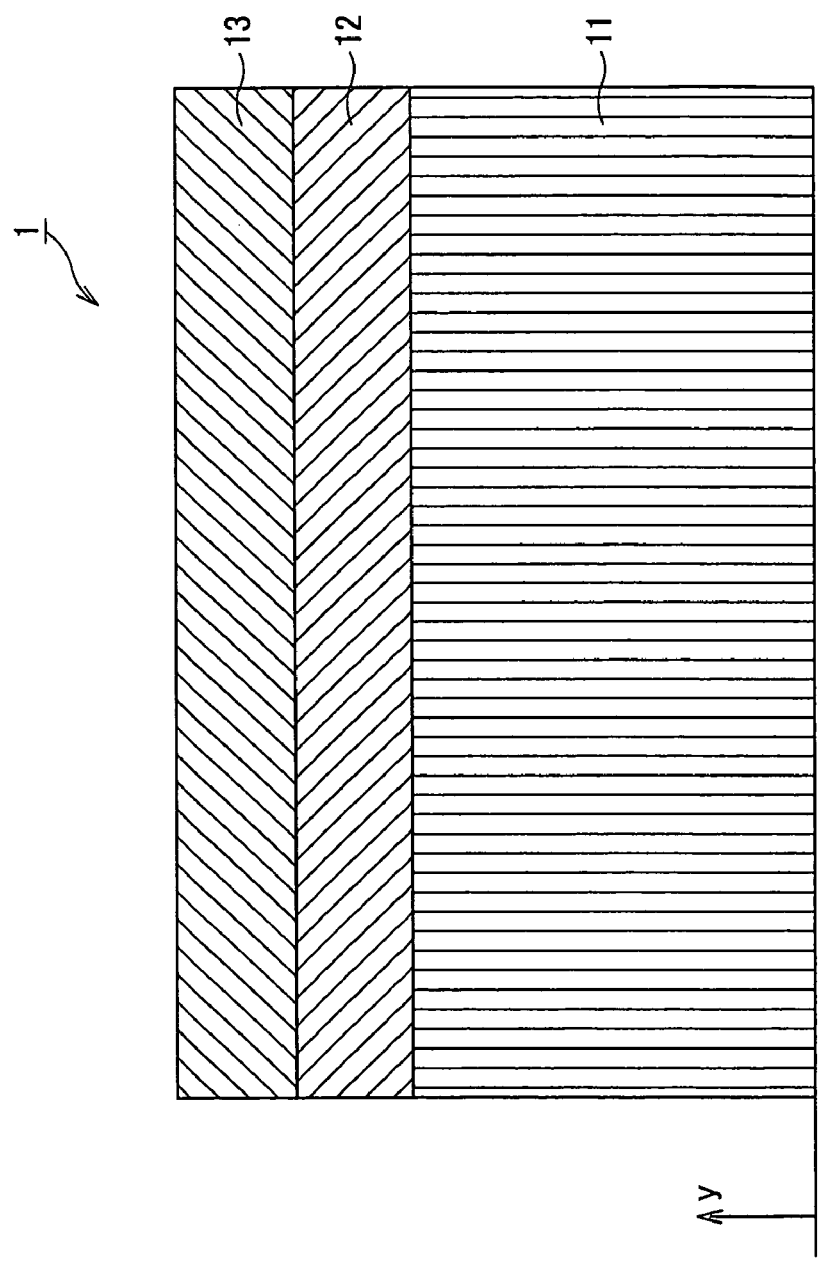
FIG. 1 is a cross-sectional view showing the schematic structure of an optical disc according to the present invention.

In an optical disc 1, as shown in FIG. 1, information recording/reproducing layer 12 is formed on a substrate 11, and a protection layer 13 is formed on the information recording/reproducing layer 12. The information recording/reproducing layer 12 and the protection layer 13 may each have a mono-layer structure or a multilayer structure. The information recording/reproducing layer 12 has a structure in which one or more layers each including at least a reflection film, a dielectric layer, and a recording layer are layered. Used as the recording film forming the information recording/reproducing layer 12 can be a film made of a phase-change-type optical recording material, a magnetic optical recording film, or a recording film containing organic pigments. The present invention uses, as the recording film, a film made of phase-change-type optical material.

The protection layer 13 provided in the optical disc 1 is 0.1 mm thick. The information recording/reproducing layer 12 is irradiated, through the protection layer 13, with a laser beam which has a wavelength of 450 nm or less, e.g., 405 nm and converged by an objective lens with an numerical aperture (NA) set to 0.78 or more, e.g., 0.8.

In the present invention, the thickness of each layer and the disc thickness of the optical disc 1 which is the total thickness of the whole disc are obtained by using a force-balancing expression and a moment-balancing expression among the layers forming the optical disc 1. The mentioned layers forming the optical disc 1 include, for example, those layers that form the multilayer structure in case where the information recording/reproducing layer 12 or the protection layer 13 has a multilayer structure.

The force-balancing expression depending on the layers forming the optical disc 1 is the following expression (5).

$$\int_0^{n1} E1(y)e(y)\,dy + \int_{n1}^{n1+n2} E2(y)e(y)\,dy + \int_{n1+n2}^{n1+n2+n3} E3(y)e(y)\,dy + \ldots + \int_{n1+\ldots+nm-1}^{n1+\ldots+nm} Em(y)e(y)\,dy = \int_0^{n1} \alpha 1(y)TE1(Y)\,dy + \int_{n1}^{n1+n2} \alpha 2(y)TE2(y)\,dy + \int_{n1+n2}^{n1+n2+n3} \alpha 3(y)TE3(y)\,dy + \ldots + \int_{n1+\ldots+nm-1}^{n1+\ldots+nm} \alpha m(y)TEm(y)\,dy \quad (5)$$

In this expression, y expresses displacement in a thickness direction of the optical disc 1, and ni (i=1, 2, 3, ..., m) expresses a thickness of each of the layers forming the optical disc 1. Also, m expresses the total number of the layers forming the optical disc 1, and Ei (i=1, 2, 3, ..., m) expresses a Young's modulus of each of the layers forming the optical disc 1. Also, e(y) expresses a distortion generated in the optical disc 1, and αi (i=1, 2, 3, ..., m) expresses an expansion coefficient depending on temperature and/or humidity in each of the layers forming the optical disc. Further, T expresses an amount of change in temperature and/or humidity around the optical disc 1.

The moment-balancing expression depending on the layers forming the optical disc 1 is the following expression (6).

$$\int_0^{n1} E1(y)e(y)y\,dy + \int_{n1}^{n1+n2} E2(y)e(y)y\,dy + \int_{n1+n2}^{n1+n2+n3} E3(y)e(y)y\,dy + \ldots + \int_{n1+\ldots+nm-1}^{n1+\ldots+nm} Em(y)e(y)y\,dy = \int_0^{n1} \alpha 1(y)TE1(y)y\,dy + \int_{n1}^{n1+n2} \alpha 2(y)TE2(y)y\,dy + \int_{n1+n2}^{n1+n2+n3} \alpha 3(y)TE3(y)y\,dy + \ldots + \int_{n1+\ldots+nm-1}^{n1+\ldots+nm} \alpha m(y)TEm(y)y\,dy \quad (6)$$

The distortion e(y) caused in the optical disc 1 is expressed by the following expression (3) assuming circular warping.

$$e(y) = eo + \kappa y \quad (3)$$

In this expression, eo expresses an initial distortion of the optical disc 1, and κ expresses a curvature of the optical disc 1. Note that the radius of curvature is 1/κ.

According to the above expressions (5), (6), and (3), the curvature κ can be expressed by the following expression (7).

$$K = \frac{AQ - CP}{AQ - BC} \quad (7)$$

However, A, B, C, D, P, and Q in the expression (7) satisfy the following expressions (8) and (9)

$$Ae0 + B\kappa = P \quad (8)$$

$$Ce0 + D\kappa = Q \quad (9)$$

On the other side, the relationship between the curvature and the warping amount in the optical disc 1 is expressed by the following expression (4)

$$\theta = -\kappa l \quad (4)$$

In this expression, θ expresses a warping amount of the optical disc 1, and 1 expresses a width of an area where the layers forming the optical disc 1 are layered, i.e., 1 is the length in radial direction of the area of the optical disc where signals are or can be recorded.

In optical discs, the disc diameter and the length in radial direction of the area where signals are or can be recorded are substantially proportional to each other. Hence, the expression (4) can be considered as showing the relationship between the diameter of the optical disc and the warping amount of the optical disc.

To attain the thickness of each layer forming the optical disc 1 and the thickness (of the whole disc) of the optical disc 1, for example, the curvature κ of the optical disc 1 is firstly calculated from the expression (4) using the length 1 in radius direction of the area, which is proportional to the diameter of the optical disc 1 and records or can record signals, and the maximum tolerance of the warping amount θ.

For example, if the optical disc 1 has a protection layer as thin as 0.1 mm, the maximum tolerance of the warping amount θ is 0.3 degrees. In this case, the warping amount of the optical disc is constrained to 0.3 degrees or less because the warping amount of 0.3 degrees or less can reduce influence from aberration such as coma aberration.

From the curvature κ thus calculated and the expression (7), the thickness of each layer forming the optical disc 1 and the thickness of the substrate of the optical disc 1 can be obtained. For example, if 0.7 mm is obtained as the thickness of the whole optical disc 1 on the basis of the above expressions, the thickness of the substrate 11 is obtained to be 0.6 mm supposing that the protection layer 13 is 0.1 mm thick. The thickness of the information recording/reproducing layer 12 is sufficiently thin relative to the thicknesses of the substrate 11 and the protection layer 13 hence need not be considered.

A substrate 11 having the thickness obtained in the above method is prepared, for example, from polycarbonate, polyolefin, or the like with use of an injection molding method or a press method. An information recording/reproducing layer 12 having the thickness obtained by the above method is formed as a film on the prepared substrate 11 by a sputtering method, a deposition method, a spin coating method, or the like. A protection layer 13 having the thickness obtained by the above method is formed on the formed information recording/reproducing layer 12 from ultraviolet curing resin, polycarbonate, PMMA, amorphous polyolefin, denaturalized acryl, or the like. The protection layer 13 may alternatively formed by adhering a film forming the protection layer 13 via ultraviolet curing resin, an adhesive agent, or an ultraviolet curing adhesive agent.

Thus in the method of manufacturing optical discs according to the present invention, the expressions considering the warping amount due to changes in temperature and/or humidity in correspondence with the diameter of the optical disc are used to decide the thickness of each layer forming the optical disc and the thickness of the whole disc. Therefore, no large warping is caused by environmental changes in temperature or humidity. Optical discs can be manufactured with capability of accurately recording and/or reproducing information signals even in circumstances where environmental temperature or humidity changes.

Figure 2:
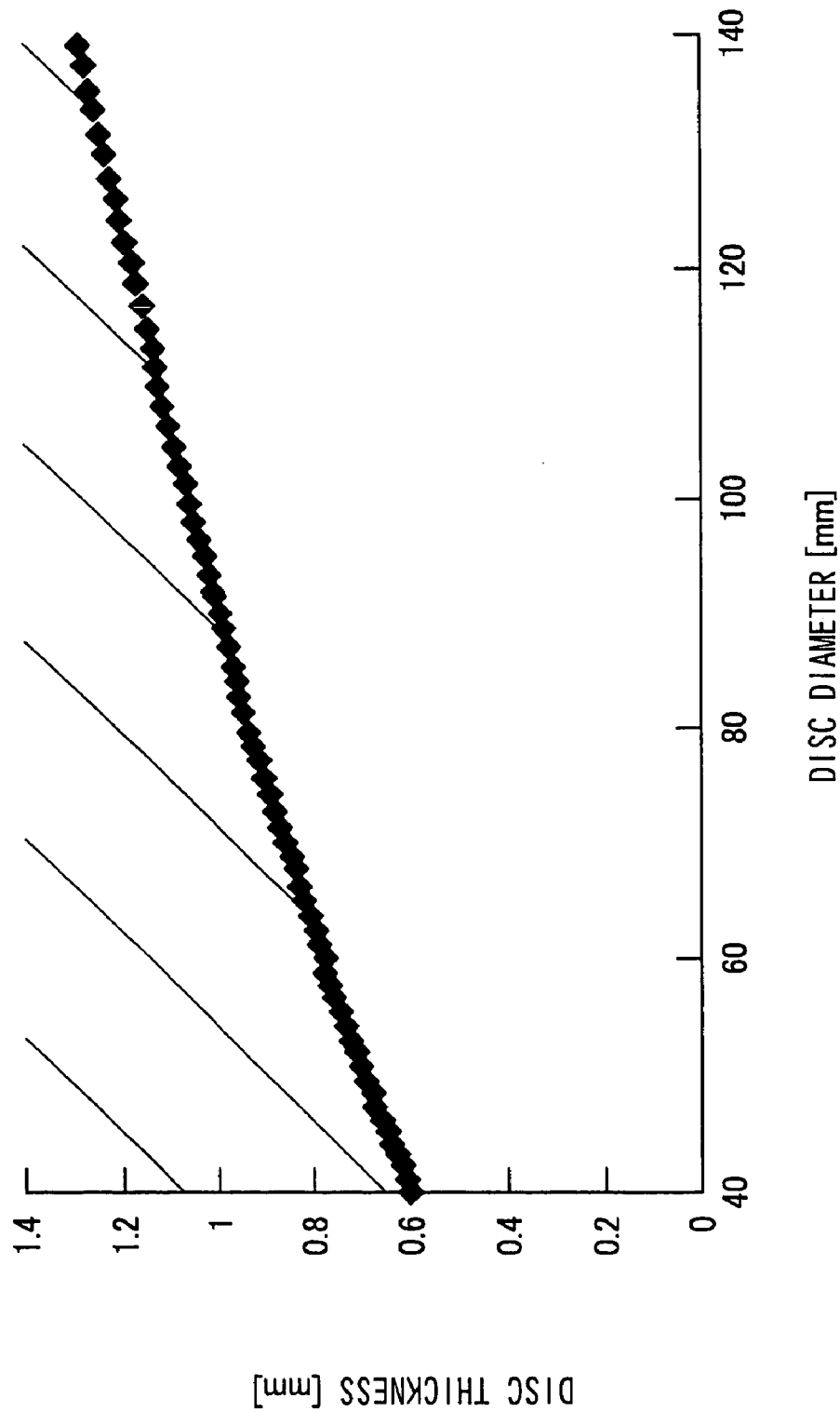
FIG. 2 is a graph showing a relationship between the disc diameter of an optical disc and the disc thickness of an optical disc obtained in a method of manufacturing an optical disc according to the present invention.

FIG. 2 shows the relationship between the disc diameter of the optical disc and the thickness of the whole optical disc obtained by the method described above. The optical disc whose whole thickness is thus obtained has the same structure as that of an optical disc which has the structure shown in FIG. 1, a protection layer as thick as about 0.1 mm and a disc diameter of about 120 mm, except for the diameter of the disc and the thickness of the whole disc.

The conditions are set as follows. That is, the maximum tolerance of the warping amount θ of the optical disc is set to 0.3 degrees. The length 1 in radial direction of the area of the optical disc where signals are recorded or can be recorded is set to about 60% of the total length. The temperature varies by 50 degrees as an environmental change.

In FIG. 2, when the thickness of the whole disc is within the hatched area in the figure, the warping amount of the optical disc is restricted to 0.3 degrees or less. This result can be used to decide the thickness of the whole disc which corresponds to the diameter of the disc.

Table 1 shows the thickness of the whole disc which is necessary to restrict the maximum warping amount to 0.3 degrees or less in case where the disc diameter is 50.5 mm, 80 mm, and 120 mm. It is found from the Table 1 that the thickness of the whole disc needs to be 0.7 mm or more in case of a small-diameter disc which has the substrate 11, the information recording/reproducing layer 12, the protection layer as thick as 0.1 mm, and a disc diameter of 50.5 mm. The thickness of the substrate needs only to be 0.6 mm or more.

In case of a disc having a diameter of 80 mm, the thickness of the whole disc needs to be 0.94 mm or more. In this case, the thickness of the substrate 11 needs only to be 0.84 mm or more which is the value attained by subtracting 0.1 mm as the thickness of the protection layer from 0.94 mm as the thickness of the whole disc.

TABLE 1

| Disc diameter [mm] | Disc thickness [mm] |
| --- | --- |
| 50.5 | 0.7 |
| 80 | 0.94 |
| 120 | 1.18 |

Examples are not limited to the one described above. For example, the thickness of the entire optical disc 1 which satisfies the condition of the maximum warping amount of 0.3 degrees or less is obtained to be 0.8 mm from the expression (7), etc., like the above example, in case where the disc diameter of 51.5 mm and the thickness of the protection layer 13 is 0.08 mm. In this case, the thickness of the substrate can be obtained to be 0.72 mm.

In practical mass-production, the numerical values described above are used, adjusted in consideration of tolerances.

Figure 3:
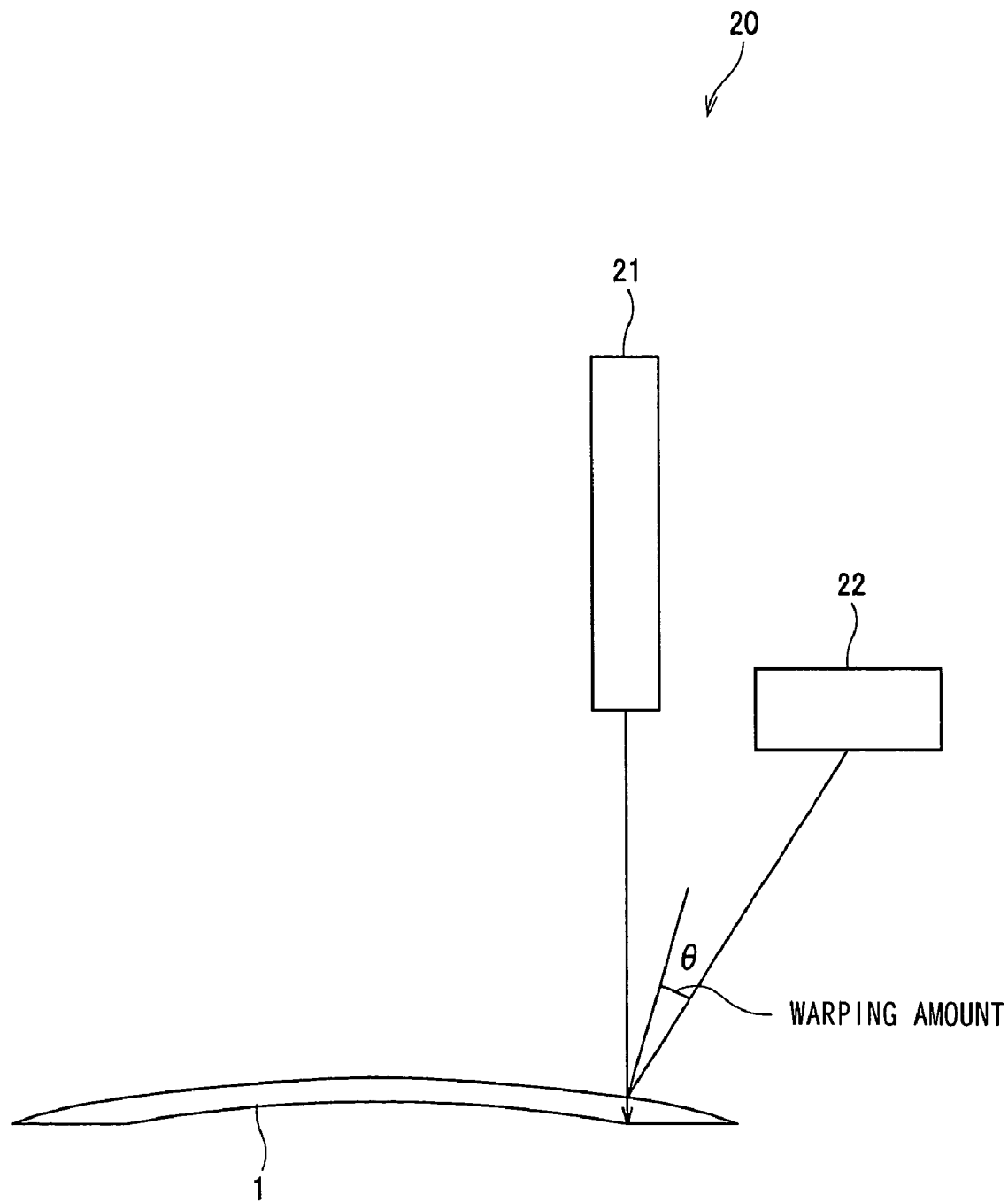
FIG. 3 is a schematic view showing the structure of a device for measuring the maximum warping amount at a predetermined disc thickness of an optical disc.

FIG. 3 shows a device which measures the maximum warping amount with respect to a predetermined disc thickness of an optical disc. A warping amount measuring device 20 has a laser light source 21, a position-detecting-light detector 22, and a disc hold mechanism not shown. The disc hold mechanism includes a rotation mechanism not shown which rotates the optical disc 1 and a movement mechanism not shown which moves the rotation mechanism in the radial direction of the optical disc.

In this warping amount measuring device 20, a laser beam emitted from the laser light source 21 is irradiated on the optical disc 1, and measures the position at which the reflected laser beam returns by use of the position-detecting-light detector 22. In accordance with the warping amount of the optical disc 1, the position at which the reflected laser beam hits the position-detecting-light detector 22 changes, so the warping amount can be measured by the change amount of this position. In this measurement, the in-circumference average of warping amounts measured by rotating once the optical disc 1 at a predetermined measurement radius is taken as the measured value at the measurement radius. The position of the measurement radius is shifted in the radial direction throughout the whole optical disc by the movement mechanism of the disc hold mechanism, the maximum measured value is taken as the maximum warping amount of the optical disc 1 having the predetermined disc thickness.

Table 2 shows measurement results of maximum warping amounts measured at respective disc thicknesses by the warping amount measuring device 20 where the disc thickness of the optical disc, i.e., the thickness of the substrate is varied. The optical disc used in this measurement has a substrate layer, an information recording/reproducing layer, and a polycarbonate protection layer having a thickness of 0.1 mm, and is a small-diameter disc whose disc diameter is 50.5 mm. In this measurement, the temperature and humidity around the optical disc were respectively set to 80 degrees and 85%, and the maximum warping amounts were measured after elapse of 96 hours.

TABLE 2

| Disc diameter [mm] | Warping amount [degree] |
|---|---|
| 0.8 | 0.23 |
| 0.7 | 0.26 |
| 0.6 | 0.36 |

As can be known from the table 2, the maximum warping amounts are as sufficiently small as 0.3 degrees or less when the disc thickness is 0.7 mm or more in case of the small-diameter disc having a disc diameter of 50.5 mm.

Thus, the small-diameter disc having a disc diameter of 50.5 mm needs only to have a disc thickness of 0.7 mm or more. The upper limit of the disc thickness, however, cannot be decided from the viewpoint of the warping amounts depending on changes in temperature and/or humidity.

Thus, in the optical disc according to the present invention, the disc thickness of the small-diameter optical disc which has a diameter of about 50 mm is decided to be 0.7 mm or more by using the expressions considering the warping amount depending on changes in temperature and/or humidity. Therefore, no large warping is caused in the optical disc even when the temperature or humidity around the optical disc changes as the optical disc is used, for example, in a portable information recording/processing terminal and carried about. Accordingly, information signals can be recorded or reproduced accurately.

In the above, the present invention has been described exemplifying concrete structures. The present invention, however, is not limited to the embodiments described above but can be modified variously. For example, the present invention has been described with respect to an optical disc having a structure as shown in FIG. 1. The present invention is not limited hitherto but is applicable to an optical disc having an arbitrary structure.

Although the present invention has been described with respect to an optical disc in which a substrate layer, an information recording/reproducing layer, and a protection layer are formed, the present invention is also applicable to an optical disc only having a substrate layer and an information recording/reproducing layer. Further, although the present invention has been described with respect to an optical disc which only has a substrate layer, an information recording/reproducing layer, and a protection layer formed, the layers forming the optical disc are not limited to these layers. For example, the present invention is also applicable to such an optical disc which has an intermediate layer between information recording/reproducing layers forming a multilayer structure if the information recording/reproducing layer of the optical disc is made of the multilayer structure.

Further, in the present invention, it has been described that the maximum tolerance of the warping amount θ of the optical disc is, for example, 0.3 degrees when the optical disc is made in a structure as shown in FIG. 1. However, if the optical disc 1 does not have the structure as shown in FIG. 1, the maximum warping amount may be decided such that influence from aberration can be restricted.

If an optical disc has a substrate, an information recording/reproducing layer, a protection layer having a thickness of 0.1 mm, and a diameter of 80 mm and is characterized by having a disc thickness of 0.94 mm or more, the same advantages can be achieved as those of an optical disc having a diameter of 50 mm.

That is, the disc thickness of an optical disc having a small diameter of about 80 mm is decided to be 0.94 mm or more by using expressions considering warping amounts depending on changes in temperature and/or humidity. Therefore, no large warping is caused in the optical disc even when the temperature or humidity around the optical disc changes as the optical disc is used, for example, in a portable information recording/processing terminal and carried about. Accordingly, information signals can be recorded or reproduced accurately.

The present invention is not limited to the above embodiments described with reference to the drawings. It would be apparent to the persons in the art that various modifications, substitution, and equivalents thereof can be made without deviating from the scope and subject matters of the claims included herein.

INDUSTRIAL APPLICABILITY

The optical disc according to the present invention is capable of preventing large warping even when temperature or humidity changes around the disc and of accurately recording and reproducing information signals when applied to an optical disc having a small-diameter.

The invention claimed is:
1. An optical disc comprising at least:
a substrate;

a recording layer layered on the substrate and having a single-layer structure or multilayer structure; and a protection layer which is layered on the recording layer and thinner than the substrate and on which a recording or reproducing laser beam is incident, wherein the substrate and the recording layer are formed to satisfy conditions of expressions below:

$$\int_0^{n1} E1(y)e(y)\,dy + \int_{n1}^{n1+n2} E2(y)e(y)\,dy + \ldots + \int_{n1+\ldots+nm-1}^{n1+\ldots+nm} Em(y)e(y)\,dy = \int_0^{n1} \alpha1(y)TE1(y)\,dy + \int_{n1}^{n1+n2} \alpha2(y)TE2(y)\,dy + \ldots + \int_{n1+\ldots+nm-1}^{n1+\ldots+nm} \alpha m(y)TEm(y)\,dy, \quad (1)$$

$$\int_0^{n1} E1(y)e(y)y\,dy + \int_{n1}^{n1+n2} E2(y)e(y)y\,dy + \ldots + \int_{n1+\ldots+nm-1}^{n1+\ldots+nm} Em(y)e(y)y\,dy = \int_0^{n1} \alpha1(y)TE1(y)y\,dy + \int_{n1}^{n1+n2} \alpha2(y)TE2(y)y\,dy + \ldots + \int_{n1+\ldots+nm-1}^{n1+\ldots+nm} \alpha m(y)TEm(y)y\,dy, \quad (2)$$

$$e(y) = eo + ky \quad (3), \text{ and}$$

$$\theta = -kl \quad (4),$$

where y expresses displacement in a thickness direction of the optical disc, ni (i=1, 2, 3, . . . , m) expresses a thickness of each of the layers forming the optical disc, m (m≧2) expresses a total number of the layers forming the optical disc, Ei (i=1, 2, 3, . . . , m) expresses a Young's modulus of each of the layers forming the optical disc, e(y) expresses a distortion generated in the optical disc, eo expresses an initial distortion of the optical disc, αi (i=1, 2, 3, . . . , m) expresses an expansion coefficient depending on temperature and/or humidity in each of the layers forming the optical disc, T expresses an amount of change in temperature and/or humidity around the optical disc, θ expresses a warping amount of the optical disc, k expresses a curvature of the optical disc, and l expresses a width of an area where the layers forming the optical disc are layered.

2. The optical disc according to claim 1, wherein the curvature k of the optical disc is calculated from the maximum warping amount θ tolerable for the optical disc, the width l of the area where the layers forming the optical disc are layered, and the expression (4), the thickness of each of the layers forming the optical disc is obtained by using the calculated curvature k of the optical disc and the expressions (1) to (3).

3. The optical disc according to claim 2, wherein the optical disc has a diameter of 80 mm or less.

4. The optical disc according to claim 3, wherein the protection layer has a thickness of 0.1 mm or less.

* * * * *